United States Patent
Choi et al.

(10) Patent No.: US 12,054,643 B2
(45) Date of Patent: Aug. 6, 2024

(54) COMPOSITION FOR STEEL SHEET SURFACE COATING AND STEEL SHEET SURFACE-COATED WITH SAME

(71) Applicants: POSCO, Pohang-si (KR); NOROO COIL COATINGS CO., LTD., Pohang-si (KR)

(72) Inventors: Chang-Hoon Choi, Pohang-si (KR); Dong-Yun Kim, Anyang-si (KR); Won-Ho Son, Pohang-si (KR); Hee-Jea Eun, Pohang-si (KR); Jae-Duck Ko, Anyang-si (KR)

(73) Assignees: POSCO CO., LTD, Pohang-si (KR); NOROO COIL COATINGS CO., LTD., Pohang-si (KR)

( * ) Notice: Subject to any disclaimer, the term of this patent is extended or adjusted under 35 U.S.C. 154(b) by 815 days.

(21) Appl. No.: 17/266,194

(22) PCT Filed: Aug. 7, 2019

(86) PCT No.: PCT/KR2019/009839
§ 371 (c)(1),
(2) Date: Feb. 5, 2021

(87) PCT Pub. No.: WO2020/032557
PCT Pub. Date: Feb. 13, 2020

(65) Prior Publication Data
US 2021/0253880 A1    Aug. 19, 2021

(30) Foreign Application Priority Data
Aug. 8, 2018  (KR) .................. 10-2018-0092319

(51) Int. Cl.
| | | |
|---|---|---|
| *C09D 4/06* | (2006.01) | |
| *C09D 4/00* | (2006.01) | |
| *C09D 5/08* | (2006.01) | |
| *C09D 7/20* | (2018.01) | |
| *C09D 7/40* | (2018.01) | |
| *C09D 7/61* | (2018.01) | |
| *C09D 7/63* | (2018.01) | |
| *B82Y 30/00* | (2011.01) | |
| *B82Y 40/00* | (2011.01) | |

(52) U.S. Cl.
CPC .............. *C09D 7/61* (2018.01); *C09D 4/00* (2013.01); *C09D 4/06* (2013.01); *C09D 5/084* (2013.01); *C09D 7/20* (2018.01); *C09D 7/63* (2018.01); *C09D 7/67* (2018.01); *B82Y 30/00* (2013.01); *B82Y 40/00* (2013.01)

(58) Field of Classification Search
CPC ... C09D 7/61; C09D 4/00; C09D 4/06; C09D 5/084; C09D 7/20; C09D 7/63; C09D 7/67; C09D 7/65; C09D 5/08; C09D 5/082; C09D 7/40; B82Y 30/00; B82Y 40/00; C08K 3/36; C08K 3/28; B05D 2202/10; B05D 2518/10; B05D 2601/22; B05D 1/18; B05D 7/14; B05D 7/24; C08F 265/02; C08F 265/06; C08F 220/1802

See application file for complete search history.

(56) References Cited

U.S. PATENT DOCUMENTS

| | | | |
|---|---|---|---|
| 2006/0261311 A1* | 11/2006 | Poulet .................. | C09D 183/04 |
| | | | 252/387 |
| 2010/0119850 A1 | 5/2010 | Browne et al. | |
| 2010/0233484 A1 | 9/2010 | Shigekuni et al. | |
| 2020/0032080 A1* | 1/2020 | Choi ........................ | C08K 5/09 |

FOREIGN PATENT DOCUMENTS

| | | |
|---|---|---|
| CN | 101668821 | 3/2010 |
| JP | 2002036427 | 2/2002 |
| JP | 2005179721 | 7/2005 |
| JP | 2012036396 | 2/2012 |
| JP | 2018020486 | 2/2018 |
| KR | 20070068526 | 7/2007 |
| KR | 20080014515 | 2/2008 |
| KR | 100816523 | 3/2008 |
| KR | 101306405 | 9/2013 |
| KR | 101417295 | 7/2014 |
| KR | 101500184 | 3/2015 |
| KR | 101560902 | 10/2015 |
| KR | 20160042295 | 4/2016 |
| KR | 101696604 B1 * | 1/2017 |
| KR | 20180035283 | 4/2018 |
| KR | 20180035283 A * | 4/2018 |

OTHER PUBLICATIONS

KR-101696604-B1, machine translation (Year: 2017).*
Chinese Office Action—Chinese Application No. 201980052829.7 issued on Jul. 28, 2021 , citing KR 10-2018-0035283, KR 10-2007-0068526, US 2010/0233484, US 2010/0119850, and CN 101668821.
European Search Report—European Application No. 19846113.9 issued on Sep. 24, 2021, citing KR 10-2018-0035283, KR 10-2007-0068526, Mosa, et al., and Harb, et al.

(Continued)

*Primary Examiner* — Anthony J Green
*Assistant Examiner* — Marites A Guino-O Uzzle
(74) *Attorney, Agent, or Firm* — CANTOR COLBURN LLP

(57) ABSTRACT

Provided is a composition for steel sheet surface coating, the composition comprising colloidal silica, a silane, a monomer, an organic resin, an acidity adjuster, a long-term corrosion-resistance improver, and a solvent; and a steel sheet coated with the composition. The steel sheet has excellent acid resistance, and maintains thickness uniformity thereof even when exposed to an acid for an extended period of time.

15 Claims, 1 Drawing Sheet

(56) References Cited

OTHER PUBLICATIONS

Harb, et al., Structural properties of cerium doped siloxane-PMMA hybrid coatings with high anticorrosive performance, RSC Advances, 2015, vol. 5, pp. 15414-15424.

Mosa, et al., Active corrosion inhibition of mild steel by evironmentally-friendly Ce-doped organic-inorganic sol-gel coatings, RSC Advances, 2016, vol. 6, pp. 39577-39586.

International Search Report—PCT/KR2019/009839 dated Nov. 11, 2019.

Chinese Office Action—Chinese Application No. 201980052829.7 issued on Jan. 30, 2022, citing Rare Earth Metallurgical Technology and Sulfuric Acid Production Technology.

Japanese Office Action—Japanese Application No. 2021-505885 issued on Mar. 29, 2022, citing JP 2019-536895, JP 2018-020486, KR 10-2013-0034123, JP 2012-036396, JP 2002-036427, and KR 10-2007-0068526.

Liu, Sulfuric Acid Production Technology, Jun. 1993, pp. 838, paragraph 3.

Shi, Rare Earth Metallurgical Technology, Apr. 2009, pp. 110-111, section 4.1.2.

\* cited by examiner

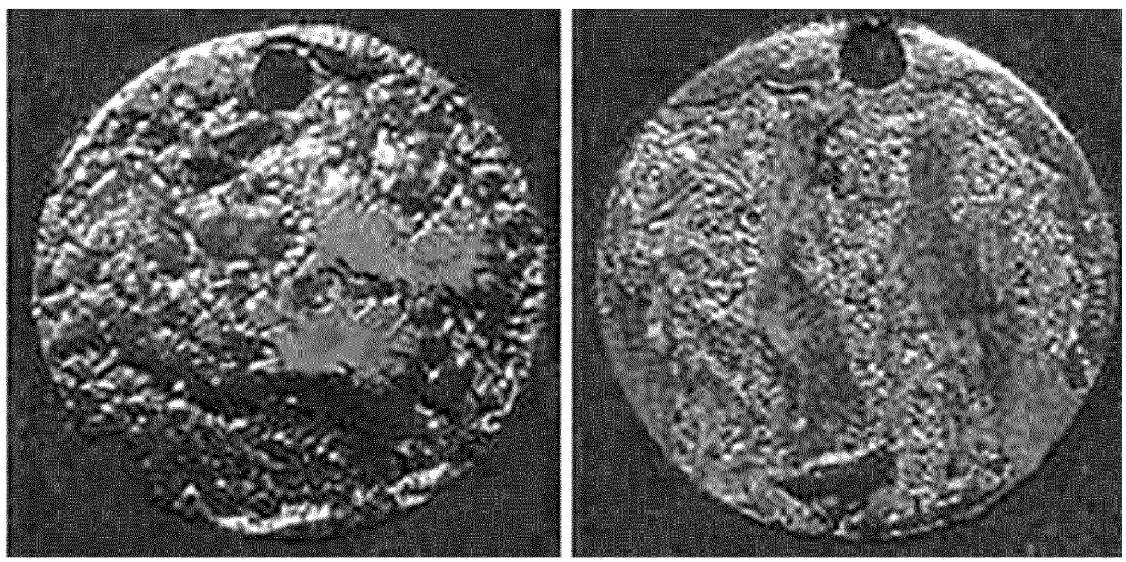

COMPOSITION FOR STEEL SHEET SURFACE COATING AND STEEL SHEET SURFACE-COATED WITH SAME

TECHNICAL FIELD

The present disclosure relates to a composition for steel sheet surface coating for improving acid corrosion resistance, a steel sheet having a surface coated with the same, and a method of producing the same.

BACKGROUND ART

The present disclosure relates to a coating composition capable of reducing dew point corrosion that occurs when sulfur oxide, nitrogen oxide, or the like, generated when burning fuel containing sulfur or the like, reacts with water in the atmosphere and adheres to a surface of a structure at a temperature lower than a dew point, and a steel sheet coated with the composition.

Sulfur oxide or nitrogen oxide becomes a strong acid such as sulfuric acid or nitric acid when reacting with water, and facilities such as a heat exchanger and a duct of a thermal power station are easily exposed to corrosive environments caused by such a strong acid, resulting in an occurrence of a corrosive reaction on a surface of a structure.

In the related art, in order to prevent such dew point corrosion, expensive stainless steel or enamel steel sheets have been used, or sulfuric acid-resistant steel, which is relatively inexpensive and highly resistant to dew point corrosion, or the like, has been applied.

However, except for the enamel steel sheet, most of materials are used without formation of a separate coating layer on a surface, and thus, dew point corrosion occurring on the surface cannot be prevented.

Accordingly, the present disclosure is intended to improve corrosion resistance and to extend the lifespan of a product by applying a coating having high resistance to a strong acid to a surface of a structure.

RELATED ART DOCUMENT

Patent Document (Patent Document 1) Korean Patent No. 10-1417295
(Patent Document 2) Korean Patent No. 10-1560902

DISCLOSURE

Technical Problem

All of the above related art documents are intended to improve corrosion resistance to a strong acid by adjusting a component of a steel sheet itself.

An object of the present disclosure is to improve corrosion resistance to a strong acid such as sulfuric acid or hydrochloric acid and to improve local corrosion and long-term corrosion resistance of a steel sheet by coating a surface of the steel sheet.

Technical Solution

According to an aspect of the present disclosure, a composition for steel sheet surface coating contains, in terms of solid content weight: 30 to 50 wt % of colloidal silica; 40 to 60 wt % of silane; 5 to 15 wt % of a monomer; 0.1 to 5.0 wt % of an organic resin; 0.01 to 1.00 wt % of an acidity regulator; and 0.01 to 12 wt % of a long-term corrosion resistance improver, wherein the long-term corrosion resistance improver is a compound containing cerium (Ce).

A particle size of the colloidal silica may be 5 nm to 50 nm.

The silane may have three or more alkoxy groups. The silane may be one or more selected from the group consisting of vinyltrimethoxysilane, vinyltriethoxysilane, vinyltriisopropoxysilane, 3-methacryloxypropyltrimethoxysilane, 2-glycidyloxypropyltrimethoxysilane, 2-glycidyloxypropyltriethoxysilane, 2-aminopropyltriethoxysilane, 2-ureidoalkyltriethoxysilane, tetraethoxysilane, triethoxyphenylsilane, and trimethoxyphenylsilane.

The monomer may be one or more selected from the group consisting of glacial acrylic acid, methyl acrylate, ethyl acrylate, butyl acrylate, 2-ethylhexyl acrylate, isobutyl acrylate, tert-butyl acrylate, tert-butyl methacrylate, butanediol monoacrylate, lauryl acrylate, dimethylaminoethyl acrylate, and dihydrodicyclopentadienyl acrylate.

The organic resin may be one or more selected from the group consisting of polyvinyl alcohol, poly(meth)acrylic acid, a copolymer of acrylic acid and methacrylic acid, a copolymer of ethylene and (meth)acrylic acid, a copolymer of ethylene and (meth)acrylate, a copolymer of ethylene and vinyl acetate, polyurethane, an amino-modified phenolic resin, a polyester resin, and an epoxy resin.

The acidity regulator may be one or more selected from the group consisting of acetic acid, formic acid, lactic acid, gluconic acid, sulfuric acid, nitric acid, hydrochloric acid, and hydrofluoric acid.

The long-term corrosion resistance improver may be one or more selected from the group consisting of cerium(III) nitrate, hydronium cerium nitrate hydrate, cerium nitrate hexahydrate, cerium(IV) nitrate, dipotassium diaquapentanitratocerate, dipotassium hexanitratocerate, tripotassium dicerium nitrate, diammonium diaquapentanitratocerate dihydrate, dirubidium diaquapentanitratocerate dihydrate, dicesium diaquapentanitratocerate dihydrate, ditalum diaquapentanitratocerate dihydrate, bis-4-(4H-1,2,4-triazol-4-yl)iminomethyl pyridinium diaquapentanitratocerate, 1,10-phenanthroline-H-diaquapentanitratocerate, hydronium cerium nitrate hydrate, ceric magnesium nitrate, ceric zinc nitrate, ceric nickel nitrate, ceric cobalt nitrate, and ceric manganese nitrate.

The composition may further contain a solvent. The solvent may be contained in an amount of 1 to 15 wt % with respect to a total weight of the composition containing the solvent. The solvent may be one or more selected from the group consisting of methanol, ethanol, 2-propanol, 2-methoxypropanol, and 2-butoxyethanol.

According to another aspect of the present disclosure, there is provided a surface-coated steel sheet having a coating layer formed on a surface coated with the composition as described above.

A thickness of the coating layer may be 0.1 to 50 μm.

After the steel sheet is immersed in an aqueous solution of 50 vol % sulfuric acid at 70° C. for 6 hours, corrosion loss of the steel sheet may be less than 15 mg/cm$^2$·hr. After the steel sheet is immersed in a mixed aqueous solution of 16.9 vol % sulfuric acid and 0.35 vol % hydrochloric acid at 60° C. for 6 hours, corrosion loss of the steel sheet may be less than 3 mg/cm$^2$·hr.

After the steel sheet is immersed in an aqueous solution of 50 vol % sulfuric acid at 70° C. for 96 hours, the thinnest thickness of a specimen may be 25% or more of an initial thickness.

Advantageous Effects

When a range of the content of each component is specified in the composition for steel sheet surface coating according to an exemplary embodiment in the present disclosure and the composition is coated on the steel sheet, film adhesion is improved, and sulfuric acid corrosion resistance and composite corrosion resistance are improved.

In addition, the composition for steel sheet surface coating contains the long-term corrosion resistance improver, such that uniformity of the thickness of the remaining steel sheet is maintained and long-term corrosion resistance is excellent even in a case in which the surface-coated steel sheet is exposed to a strong acid for an extended period of time.

DESCRIPTION OF DRAWINGS

FIG. 1 illustrates a specimen (left) of a steel sheet whose edge is worn out due to local corrosion and a good specimen (right) in a long-term corrosion resistance evaluation.

BEST MODE FOR INVENTION

Hereinafter, preferred exemplary embodiments in the present disclosure will be described. However, the exemplary embodiments in the present disclosure may be modified to have several other forms, and the scope of the present disclosure is not limited to exemplary embodiments to be described below.

The present disclosure relates to a composition for steel sheet surface coating capable of being coated on a surface of a steel sheet. The composition for steel sheet surface coating contains colloidal silica, silane, a monomer, an organic resin, an acidity regulator, and a long-term corrosion resistance improver.

In the composition for steel sheet surface coating of the present disclosure, a particle size of the nanoparticle colloidal silica is preferably 5 to 50 nm. When the particle size of the silica is less than 5 nm, a surface area of the silica is too large, and the amount of silane reacting with the silane is thus relatively insufficient. Therefore, a surface of the silica is not sufficiently modified, resulting in a reduction in acid corrosion resistance. Meanwhile, when the particle size of the silica exceeds 50 nm, a porosity between the silica is high, resulting in a reduction in acid corrosion resistance.

The colloidal silica forms an intermediate by a sol-gel reaction with the silane, a main resin is synthesized by a reaction between the intermediate and the monomer, and an organic and inorganic mixed resin is formed by adding the organic resin to the main resin.

In the composition for steel sheet surface coating of the present disclosure, the colloidal silica may be contained in an amount of 30 to 50 wt % with respect to the composition for steel sheet surface coating. When a content of the colloidal silica is less than 30 wt %, the colloidal silica may not be sufficiently bonded to the silane, such that a hardness may be reduced. Therefore, acid corrosion resistance may not be secured. When the content of the colloidal silica exceeds 50 wt %, silica which is not bonded to the silane may remain, such that formation of a film may be deteriorated. Therefore, acid corrosion resistance may not be secured.

In the composition for steel sheet surface coating of the present disclosure, a type of the silane is not particularly limited, but it is preferable that the silane has three or more alkoxy groups and may be stabilized after hydrolysis.

The silane may include one or more selected from the group consisting of vinyltrimethoxysilane, vinyltriethoxysilane, vinyltriisopropoxysilane, 3-methacryloxypropyltrimethoxysilane, 2-glycidyloxypropyltrimethoxysilane, 2-glycidyloxypropyltriethoxysilane, 2-aminopropyltriethoxysilane, 2-ureidoalkyltriethoxysilane, tetraethoxysilane, triethoxyphenylsilane, and trimethoxyphenylsilane.

In addition, the silane may be contained in an amount of 40 to 60 wt % with respect to the composition for steel sheet surface coating. When a content of the silane is less than 40 wt %, the silane may not be sufficiently bonded to the colloidal silica, such that formation of a film may be deteriorated. Therefore, acid corrosion resistance may not be secured. When the content of the silane exceeds 60 wt %, an organic gas generated due to pyrolysis may be discharged, and a large amount of silanol may remain, such that film adhesion may be reduced. Therefore, acid corrosion resistance may not be secured.

In the composition for steel sheet surface coating of the present disclosure, the monomer contributes to film formation and a crosslinking reaction when coating a steel sheet, and a type of the monomer is not particularly limited, but the monomer is preferably one or more selected from the group consisting of glacial acrylic acid, methyl acrylate, ethyl acrylate, butyl acrylate, 2-ethylhexyl acrylate, isobutyl acrylate, tert-butyl acrylate, tert-butyl methacrylate, butanediol monoacrylate, lauryl acrylate, dimethylaminoethyl acrylate, and dihydrodicyclopentadienyl acrylate.

The monomer may be contained in an amount of 5 to 15 wt % with respect to the composition for steel sheet surface coating. When a content of the monomer is less than 5 wt %, the monomer may not be sufficiently bonded to silica and a synthetic silane polymer, such that formation of a film may be deteriorated. Therefore, acid corrosion resistance may not be secured. When the content of the monomer exceeds 15 wt %, water resistance may be reduced due to an unreacted remaining monomer, resulting in a reduction in acid corrosion resistance.

In the composition for steel sheet surface coating of the present disclosure, the organic resin is used to enhance adhesion with a steel sheet and to improve drying properties. A type of the organic resin is not particularly limited, but the organic resin may be one or more selected from the group consisting of polyvinyl alcohol, poly(meth)acrylic acid, a copolymer of acrylic acid and methacrylic acid, a copolymer of ethylene and (meth)acrylic acid, a copolymer of ethylene and (meth)acrylate, a copolymer of ethylene and vinyl acetate, polyurethane, an amino-modified phenolic resin, a polyester resin, and an epoxy resin.

The organic resin may be contained in an amount of 0.1 to 5.0 wt % with respect to the composition for steel sheet surface coating. When a content of the organic resin is less than 0.1 wt %, adhesion may be reduced and drying may not be easily performed when coating a steel sheet. Therefore, acid corrosion resistance may not be secured. When the content of the organic resin exceeds 5.0 wt %, water resistance may be reduced, resulting in an occurrence of a film peeling phenomenon.

In the composition for steel sheet surface coating of the present disclosure, the acidity regulator is used to accelerate hydrolysis of the silane and to improve stability. A type of the acidity regulator is not particularly limited, but the acidity regulator may be one or more selected from the group consisting of an organic acid such as acetic acid, formic acid, lactic acid, or gluconic acid, an inorganic acid such as sulfuric acid, nitric acid, hydrochloric acid, or hydrofluoric acid, and a mixture of the organic acid and the inorganic acid.

The acidity regulator may be contained in an amount of 0.01 to 1.00 wt % with respect to the composition for steel sheet surface coating. When a content of the acidity regulator is less than 0.01 wt %, the time required for hydrolysis may increase, such that solution stability of the entire composition may be deteriorated. When the content of the acidity regulator exceeds 1.00 wt %, corrosion of a steel sheet may occur due to the acidity regulator, and a molecular weight of a silicone resin may not be easily controlled.

In the composition for steel sheet surface coating of the present disclosure, the long-term corrosion resistance improver serves to improve local corrosion occurring after coating of a steel sheet and thus to improve uniformity of a thickness of a remaining steel sheet. A type of the long-term corrosion resistance improver is not particularly limited, but the long-term corrosion resistance improver is preferably a compound containing cerium. In this case, cerium may coexist in a coating layer of a steel sheet as soluble trivalent cerium and insoluble tetravalent cerium. When the steel sheet is in contact with a strong acid such as sulfuric acid or hydrochloric acid, trivalent cerium migrates and transitions to tetravalent cerium to form a film at a portion exposed to the strong acid, such that long-term corrosion resistance to an acid is improved.

The compound containing cerium may be one or more selected from the group consisting of cerium(III) nitrate, hydronium cerium nitrate hydrate, cerium nitrate hexahydrate, cerium(IV) nitrate, dipotassium diaquapentanitratocerate, dipotassium hexanitratocerate, tripotassium dicerium nitrate, diammonium diaquapentanitratocerate dihydrate, dirubidium diaquapentanitratocerate dihydrate, dicesium diaquapentanitratocerate dihydrate, ditalum diaquapentanitratocerate dihydrate, bis-4-(4H-1,2,4-triazol-4-yl)iminomethyl pyridinium diaquapentanitratocerate, 1,10-phenanthroline-H-diaquapentanitratocerate, hydronium cerium nitrate hydrate, ceric magnesium nitrate, ceric zinc nitrate, ceric nickel nitrate, ceric cobalt nitrate, and ceric manganese nitrate.

The long-term corrosion resistance improver may be contained in an amount of 0.01 to 12 wt % with respect to the composition for steel sheet surface coating. When a content of the long-term corrosion resistance improver is less than 0.01 wt %, an effect of improving long-term corrosion resistance is insufficient, such that a part of the steel sheet may be worn out. When the content of the long-term corrosion resistance improver exceeds 12 wt %, the effect of improving long-term corrosion resistance may be insufficient, and solution stability may be deteriorated.

The composition for steel sheet surface coating of the present disclosure may contain a solvent. The solvent serves to adjust compatibility and hydrolysis ability of the silane with water, wettability of the composition for a metal surface, a drying rate, and the like. A type of the solvent is not particularly limited, but the solvent may preferably include one or more selected from the group consisting of methanol, ethanol, 2-propanol, 2-methoxypropanol, and 2-butoxyethanol.

The solvent may be contained in an amount of 1 to 15 wt % with respect to the composition for steel sheet surface coating. When a content of the solvent is less than 1 wt %, the compatibility is reduced, such that storability of the composition may be deteriorated, and acid corrosion resistance after coating may not be secured. When the content of the solvent exceeds 15 wt %, a viscosity of a solution may be excessively lowered, such that stability may be deteriorated, and acid corrosion resistance after coating may not be secured.

In the present disclosure, a steel sheet having improved acid corrosion resistance may be produced by coating the steel sheet using the composition for steel sheet surface coating as a coating liquid. A surface-coated steel sheet is produced through a step of immersing a steel sheet in the composition for steel sheet surface coating and a step of drying and curing the steel sheet in an oven at 150 to 420° C. A thickness of a coating layer to which the composition is applied is preferably 0.1 to 50 μm. When the thickness is less than 0.1 μm, in a case in which the steel sheet is exposed to a strong acid such as sulfuric acid, the steel sheet may be easily corroded due to a thin thickness of the coating layer. When the thickness exceeds 50 μm, film adhesion may be reduced, and sulfuric acid corrosion resistance after processing may thus be reduced, which is not preferable.

MODE FOR INVENTION

Hereinafter, Examples of the present disclosure will be described in detail. However, the following Examples are provided only for assisting in the understanding of the present disclosure, but are not intended to limit the present disclosure.

1. Examples 1 to 4 and Comparative Examples 1 to 10

A method of producing a composition for steel sheet surface coating of the present disclosure is as follows. First, each of tetraethoxysilane, ethanol as a solvent, acetic acid as an acidity regulator, and cerium(III) nitrate as a long-term corrosion resistance improver was added to colloidal silica Ludox HSA (solid content 30%, particle size 12 mm, W. R. Grace & Co.-Conn.), and stirring was performed for about 5 hours while performing cooling so that the temperature did not exceed about 50° C. In this case, the silane was hydrolyzed, and the colloidal silica was surface-modified by the silane. After a sufficient reaction was performed, each of ethyl acrylate as a monomer and poly(meth)acrylic acid as an organic resin was added, and an addition reaction was performed for about 24 hours.

The steel sheet was immersed in the composition for steel sheet surface coating produced with the compositions as shown in Table 1, the steel sheet was removed from the composition, and the steel sheet was put into an oven at about 250° C. and then was dried and cured, thereby producing a surface-coated steel sheet. In order to measure corrosion properties of the surface-coated steel sheet under sulfuric acid corrosion conditions, a steel sheet specimen was immersed in an aqueous solution of 50 vol % sulfuric acid at a temperature maintained at 70° C. for 6 hours, and corrosion loss of the specimen was measured. In addition, in order to measure corrosion properties of the surface-coated steel sheet under sulfuric acid-hydrochloric acid composite corrosion conditions, the steel sheet specimen was immersed in a mixed aqueous solution of 16.9 vol % sulfuric acid and 0.35 vol % hydrochloric acid at a temperature maintained at 60° C. for 6 hours, and corrosion loss of the specimen was measured.

TABLE 1

| Classification | Thickness of coating layer (µm) | Content (wt %) | | | | | | Long-term corrosion resistance improvement |
| --- | --- | --- | --- | --- | --- | --- | --- | --- |
| | | Colloidal silica | Silane | Solvent | Acidity regulator | Monomer | Organic resin | |
| Example 1 | 36 | 36 | 44 | 10.00 | 0.50 | 8.00 | 0.50 | 1.00 |
| Example 2 | 19 | 37 | 42 | 3.40 | 0.60 | 6.00 | 0.40 | 10.60 |
| Example 3 | 21 | 32 | 42 | 8.00 | 0.60 | 11.00 | 0.40 | 6.00 |
| Example 4 | 4 | 35 | 49 | 4.00 | 0.50 | 6.00 | 2.50 | 3.00 |
| Comparative Example 1 | 35 | 53 | 40 | 1.00 | 0.20 | 5.00 | 0.20 | 0.60 |
| Comparative Example 2 | 32 | 50 | 22 | 14.00 | 0.80 | 6.50 | 2.40 | 4.30 |
| Comparative Example 3 | 32 | 38 | 40 | 3.00 | 2.50 | 10.00 | 0.50 | 6.00 |
| Comparative Example 4 | 43 | 39 | 48 | 0.00 | 0.50 | 5.50 | 0.50 | 6.50 |
| Comparative Example 5 | 33 | 33 | 41 | 5.00 | 0.60 | 18.00 | 0.40 | 2.00 |
| Comparative Example 6 | 6 | 36 | 42 | 3.60 | 0.20 | 5.70 | 10.00 | 2.50 |
| Comparative Example 7 | 1 | 30 | 62 | 1.00 | 0.70 | 5.10 | 0.20 | 1.00 |
| Comparative Example 8 | 0.03 | 38 | 44 | 3.40 | 0.60 | 10.00 | 0.00 | 4.00 |
| Comparative Example 9 | 26 | 32 | 45 | 10.00 | 0.60 | 12.00 | 0.40 | 0.00 |
| Comparative Example 10 | 65 | 32 | 51 | 9.50 | 0.10 | 5.00 | 0.90 | 1.50 |

2. Comparative Example 11

A composition for steel sheet surface coating was produced in the same manner as that of Example 3, except that vanadium (III) oxide was used as the long-term corrosion resistance improver.

The steel sheet was immersed in the produced composition for steel sheet surface coating, the steel sheet was removed from the composition, and the steel sheet was put into an oven at about 250° C. and then was dried and cured, thereby producing a surface-coated steel sheet. In order to measure corrosion properties of the surface-coated steel sheet under sulfuric acid corrosion conditions, a steel sheet specimen was immersed in an aqueous solution of 50 vol % sulfuric acid at a temperature maintained at 70° C. for 6 hours, and corrosion loss of the specimen was measured. In addition, in order to measure corrosion properties of the surface-coated steel sheet under sulfuric acid-hydrochloric acid composite corrosion conditions, the steel sheet specimen was immersed in a mixed aqueous solution of 16.9 vol % sulfuric acid and 0.35 vol % hydrochloric acid at a temperature maintained at 60° C. for 6 hours, and corrosion loss of the specimen was measured.

Physical properties of the composition for steel sheet surface coating and the surface-coated steel sheet that were produced in each of Examples and Comparative Examples were measured by the method presented below.

(1) Sulfuric Acid Corrosion Resistance

The surface-coated steel sheet produced in each of Examples and Comparative Examples was cut into a size of a diameter of 38 mm to prepare a specimen, the specimen was immersed in an aqueous solution of 50 vol % sulfuric acid at a temperature maintained at 70° C. for 6 hours, and then corrosion loss of the specimen was measured.

<Evaluation Criteria of Sulfuric Acid Corrosion Resistance>

○: Less than 15 mg/cm$^2$·hr
Δ: 15 mg/cm$^2$·hr or more and less than 65 mg/cm$^2$·hr
x: 65 mg/cm$^2$·hr or more (2) Composite Corrosion Resistance The surface-coated steel sheet produced in each of Examples and Comparative Examples was cut into a size of a diameter of 38 mm to prepare a specimen, the specimen was immersed in a mixed aqueous solution of 16.9 vol % sulfuric acid and 0.35 vol % hydrochloric acid at a temperature maintained at 60° C. for 6 hours, and then corrosion loss of the specimen was measured.

<Evaluation Criteria of Composite Corrosion Resistance>

○: Less than 3 mg/cm$^2$·hr
Δ: 3 mg/cm$^2$·hr or more and less than 6 mg/cm$^2$·hr
x: 6 mg/cm$^2$·hr or more (3) Film Adhesion The surface-coated steel sheet produced in each of Examples and Comparative Examples was cut into a size of 150 cm×75 cm (width×length) to prepare a specimen, a line was horizontally and vertically drawn on a surface of the specimen using a cross cut guide to form 100 squares with an interval of 1 mm, a portion in which the 100 squares were formed was pushed up to a height of 6 mm using an erichsen tester, a peeling tape (NB-1, manufactured by Ichiban Co., Ltd.) was attached to the pushed-up portion, and whether or not the erichsen portion was peeled off was observed while detaching the peeling tape.

<Evaluation Criteria of Film Adhesion>

φ: No peeling was observed on the surface
Δ: The number of the surfaces on which the peeling was observed was 1 to 3 out of 100 squares
x: The number of the surfaces on which the peeling was observed was more than 3 out of 100 squares (4) Sulfuric Acid Corrosion Resistance after Processing The surface-coated steel sheet produced in each of Examples and Comparative Examples was cut into a size of a diameter of 38 mm to prepare a specimen, the specimen was processed to a height of 6 mm using an erichsen tester, the specimen was immersed in an aqueous solution of 50 vol % sulfuric acid at a temperature maintained at 70° C. for 6 hours, and then corrosion loss of the specimen was measured.

<Evaluation Criteria of Sulfuric Acid Corrosion Resistance after Processing>

○: Less than 15 mg/cm²·hr
Δ: 15 mg/cm²·hr or more and less than 65 mg/cm²·hr
x: 65 mg/cm²·hr or more (5) Long-Term Corrosion Resistance (Minimum Thickness)

The surface-coated steel sheet produced in each of Examples and Comparative Examples was cut into a size of a diameter of 38 mm to prepare a specimen, the specimen was immersed in an aqueous solution of 50 vol % sulfuric acid at a temperature maintained at 70° C. for 96 hours, and then corrosion loss of the specimen was measured. The thinnest thickness of the specimen after the corrosion as compared to the initial thickness was measured and expressed as %.

<Evaluation Criteria of Long-Term Corrosion Resistance>

○: 25% or more of initial thickness
Δ: 8% or more and less than 25% of initial thickness
x: Less than 8% of initial thickness The measurement results of the physical properties of the surface-coated steel sheets produced in Examples 1 to 4 and Comparative Examples 1 to 11 are shown in Table 2.

TABLE 2

| Classification | Sulfuric acid corrosion resistance | Composite corrosion resistance | Film adhesion | Sulfuric acid corrosion resistance after processing | Long-term corrosion resistance |
|---|---|---|---|---|---|
| Example 1 | ○ | ○ | ○ | ○ | ○ |
| Example 2 | ○ | ○ | ○ | ○ | ○ |
| Example 3 | ○ | ○ | ○ | ○ | ○ |
| Example 4 | ○ | ○ | ○ | ○ | ○ |
| Comparative Example 1 | x | x | x | ○ | ○ |
| Comparative Example 2 | x | x | x | ○ | ○ |
| Comparative Example 3 | Δ | x | ○ | ○ | ○ |
| Comparative Example 4 | x | x | x | ○ | ○ |
| Comparative Example 5 | x | x | ○ | ○ | ○ |
| Comparative Example 6 | x | x | ○ | ○ | ○ |
| Comparative Example 7 | x | x | Δ | ○ | ○ |
| Comparative Example 8 | x | x | ○ | x | x |
| Comparative Example 9 | ○ | ○ | ○ | ○ | x |
| Comparative Example 10 | ○ | ○ | x | x | ○ |
| Comparative Example 11 | ○ | Δ | ○ | ○ | x |

As shown in Table 2, it can be appreciated that in the case of Examples 1 to 4 according to the present disclosure, the sulfuric acid corrosion resistance, the composite corrosion resistance, and the film adhesion were significantly excellent. In addition, it can be confirmed that a surface defect such as a boiling phenomenon did not occur during the coating and drying process, such that a significantly excellent surface quality was secured, and uniformity of the thickness of the remaining steel sheet was maintained even when the steel sheet was immersed in sulfuric acid for an extended period of time.

However, it can be appreciated that in the case of Comparative Example 1, an excessive amount of the colloidal silica was added and reacted with the silane, and a large amount of the colloidal silica thus remained, resulting in inhibition of formation of the coating layer, and thus, the sulfuric acid corrosion resistance and the composite corrosion resistance were remarkably reduced, and the film adhesion was also poor.

It can be appreciated that in the case of Comparative Example 2, the surface of the colloidal silica was not sufficiently modified due to an insufficient content of the silane as in Comparative Example 1, and formation of the coating layer was thus inhibited due to a large amount of the remaining silica, such that the sulfuric acid corrosion resistance and the composite corrosion resistance were reduced, and the film adhesion was also poor.

It can be appreciated that in the case of Comparative Example 3, an excessive amount of the acidity regulator was added to accelerate hydrolysis of the silane, such that the molecular weight of the organic and inorganic mixed resin was excessively increased, resulting in gelation of the solution or in a reduction in the sulfuric acid corrosion resistance or the composite corrosion resistance even when the steel sheet was coated. In addition, corrosion of the steel sheet may occur due to the remaining acidity regulator.

It can be appreciated that in the case of Comparative Example 4, since the solvent was not contained, gelation easily occurred in the production process of the composition for steel sheet surface coating, and the sulfuric acid corrosion resistance and the composite corrosion resistance after the coating of the steel sheet were reduced.

It can be appreciated that in the case of each of Comparative Examples 5 and 6, an excessive amount of each of the monomer and the organic resin was added, and in a case in which the content of the organic component to the content of the inorganic component was excessively high, the sulfuric acid corrosion resistance and the composite corrosion resistance were reduced.

It can be appreciated that in the case of Comparative Example 7, since an excessive amount of the silane was added, an organic gas was discharged due to pyrolysis in the production process of the composition for steel sheet surface coating, and the sulfuric acid corrosion resistance and the composite corrosion resistance after the coating of the steel sheet were reduced due to a large amount of the remaining silane.

It can be appreciated that in the case of Comparative Example 8, the sulfuric acid corrosion resistance, the composite corrosion resistance, the sulfuric acid corrosion resistance after processing, and the long-term corrosion resistance were reduced due to an insufficient thickness of the coating layer.

It can be appreciated that in the case of Comparative Example 9, the long-term corrosion resistance was poor due to no addition of the long-term corrosion resistance improver.

It can be appreciated that in the case of Comparative Example 10, the thickness of the coating layer exceeded an appropriate thickness, and the film adhesion and the sulfuric acid corrosion resistance after processing were thus reduced.

It can be appreciated that in the case of Comparative Example 11, the long-term corrosion resistance was inferior as compared to Example 3 in which vanadium (III) oxide was used as the long-term corrosion resistance improver to form the film formed of tetravalent cerium.

The invention claimed is:

1. A composition for steel sheet surface coating comprising, in terms of solid content weight:
   30 to 50 wt % of colloidal silica;
   40 to 60 wt % of silane;
   5 to 15 wt % of a monomer;
   0.1 to 5.0 wt % of an organic resin;
   0.01 to 1.00 wt % of an acidity regulator; and
   0.01 to 12 wt % of a long-term corrosion resistance improver,
   wherein the long-term corrosion resistance improver is a compound containing cerium (Ce).

2. The composition of claim 1, wherein a particle size of the colloidal silica is 5 nm to 50 nm.

3. The composition of claim 1, wherein the silane has three or more alkoxy groups.

4. The composition of claim 3, wherein the silane is one or more selected from the group consisting of vinyltrimethoxysilane, vinyltriethoxysilane, vinyltriisopropoxysilane, 3-methacryloxypropyltrimethoxysilane, 2-glycidyloxypropyltrimethoxysilane, 2-glycidyloxypropyltriethoxysilane, 2-aminopropyltriethoxysilane, 2-ureidoalkyltriethoxysilane, tetraethoxysilane, triethoxyphenylsilane, and trimethoxyphenylsilane.

5. The composition of claim 1, wherein the monomer is one or more selected from the group consisting of glacial acrylic acid, methyl acrylate, ethyl acrylate, butyl acrylate, 2-ethylhexyl acrylate, isobutyl acrylate, tert-butyl acrylate, tert-butyl methacrylate, butanediol monoacrylate, lauryl acrylate, dimethylaminoethyl acrylate, and dihydrodicyclopentadienyl acrylate.

6. The composition of claim 1, wherein the organic resin is one or more selected from the group consisting of polyvinyl alcohol, poly(meth)acrylic acid, a copolymer of acrylic acid and methacrylic acid, a copolymer of ethylene and (meth)acrylic acid, a copolymer of ethylene and (meth)acrylate, a copolymer of ethylene and vinyl acetate, polyurethane, an amino-modified phenolic resin, a polyester resin, and an epoxy resin.

7. The composition of claim 1, wherein the acidity regulator is one or more selected from the group consisting of acetic acid, formic acid, lactic acid, gluconic acid, sulfuric acid, nitric acid, hydrochloric acid, and hydrofluoric acid.

8. The composition of claim 1, wherein the long-term corrosion resistance improver is one or more selected from the group consisting of cerium(III) nitrate, hydronium cerium nitrate hydrate, cerium nitrate hexahydrate, cerium (IV) nitrate, dipotassium diaquapentanitratocerate, dipotassium hexanitratocerate, tripotassium dicerium nitrate, diammonium diaquapentanitratocerate dihydrate, dirubidium diaquapentanitratocerate dihydrate, dicesium diaquapentanitratocerate dihydrate, ditalum diaquapentanitratocerate dihydrate, bis-4-(4H-1,2,4-triazol-4-yl)iminomethyl pyridinium diaquapentanitratocerate, 1,10-phenanthroline-H-diaquapentanitratocerate, hydronium cerium nitrate hydrate, ceric magnesium nitrate, ceric zinc nitrate, ceric nickel nitrate, ceric cobalt nitrate, and ceric manganese nitrate.

9. The composition of claim 1, further comprising a solvent,
   wherein the solvent is contained in an amount of 1 to 15 wt % with respect to a total weight of the composition containing the solvent.

10. The composition of claim 9, wherein the solvent is one or more selected from the group consisting of methanol, ethanol, 2-propanol, 2-methoxypropanol, and 2-butoxyethanol.

11. A surface-coated steel sheet having a coating layer formed on a surface coated with the composition of claim 1.

12. The surface-coated steel sheet of claim 11, wherein a thickness of the coating layer is 0.1 to 50 μm.

13. The surface-coated steel sheet of claim 11, wherein after the steel sheet is immersed in an aqueous solution of 50 vol % sulfuric acid at 70° C. for 6 hours, corrosion loss of the steel sheet is less than 15 mg/cm²·hr.

14. The surface-coated steel sheet of claim 11, wherein after the steel sheet is immersed in a mixed aqueous solution of 16.9 vol % sulfuric acid and 0.35 vol % hydrochloric acid at 60° C. for 6 hours, corrosion loss of the steel sheet is less than 3 mg/cm²·hr.

15. The surface-coated steel sheet of claim 11, wherein after the steel sheet is immersed in an aqueous solution of 50 vol % sulfuric acid at 70° C. for 96 hours, the thinnest thickness of a specimen is 25% or more of an initial thickness.

* * * * *